United States Patent
Valk et al.

(10) Patent No.: US 10,613,979 B2
(45) Date of Patent: Apr. 7, 2020

(54) ACCELERATOR MEMORY COHERENCY WITH SINGLE STATE MACHINE

(71) Applicant: International Business Machines Corporation, Armonk, NY (US)

(72) Inventors: Kenneth M. Valk, Rochester, MN (US); Guy L. Guthrie, Austin, TX (US); Derek E. Williams, Austin, TX (US); Michael S. Siegel, Raleigh, NC (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 15/826,970

(22) Filed: Nov. 30, 2017

(65) Prior Publication Data
US 2019/0163633 A1    May 30, 2019

(51) Int. Cl.
*G06F 12/0831*     (2016.01)
*G06F 12/0864*     (2016.01)

(52) U.S. Cl.
CPC ...... *G06F 12/0831* (2013.01); *G06F 12/0864* (2013.01); *G06F 2212/6032* (2013.04); *G06F 2212/621* (2013.01)

(58) Field of Classification Search
CPC ............. G06F 12/0831; G06F 12/0864; G06F 2212/6032; G06F 2212/621
See application file for complete search history.

(56) References Cited

U.S. PATENT DOCUMENTS

| 4,949,245 | A | * | 8/1990 | Martin | G06F 3/0601 |
| | | | | | 710/30 |
| 5,588,131 | A | | 12/1996 | Borrill | |
| 5,623,628 | A | | 4/1997 | Brayton et al. | |
| 6,373,493 | B1 | * | 4/2002 | Rickard | G06F 3/14 |
| | | | | | 345/520 |
| 6,393,534 | B1 | * | 5/2002 | Chen | G06F 13/1631 |
| | | | | | 711/158 |
| 6,687,773 | B1 | * | 2/2004 | Stewart | G06F 13/4027 |
| | | | | | 370/402 |
| 6,763,434 | B2 | * | 7/2004 | Arimilli | G06F 12/0831 |
| | | | | | 711/145 |
| 7,076,613 | B2 | | 7/2006 | Peir et al. | |

(Continued)

FOREIGN PATENT DOCUMENTS

EP    0905628 A2    3/1999

OTHER PUBLICATIONS

Shen, "Multicore Cache Coherence", Foundations of Computer Systems, Oct. 25, 2017, Electrical & Computer Engineering, Carnegie Mellon University, 62 pages.

*Primary Examiner* — Nanci N Wong
(74) *Attorney, Agent, or Firm* — Daniel C. Housley (57) ABSTRACT

A claw-back request, received from an accelerator, is issued for an address line. While waiting for a response to the claw-back request, a cast-out push request with a matching address line is received. The cast-out push request is associated with a cache having a modified copy of the address line. A combined-response, associated with the cast-out push request, is received from a bus. Data associated with the modified copy of the address line is received from the cache. A claw-back response, with the data associated with the modified version of the address line, is issued to an accelerator.

20 Claims, 5 Drawing Sheets

(56) References Cited

U.S. PATENT DOCUMENTS

| | | | |
|---|---|---|---|
| 7,409,504 B2 | 8/2008 | Rajamony et al. | |
| 8,037,253 B2 | 10/2011 | Petersen et al. | |
| 8,375,170 B2 | 2/2013 | Laycock et al. | |
| 8,812,786 B2 | 8/2014 | Beckmann et al. | |
| 2003/0009632 A1* | 1/2003 | Arimilli | G06F 12/0813 711/137 |
| 2003/0217238 A1* | 11/2003 | Rowlands | G06F 12/082 711/154 |
| 2004/0255085 A1* | 12/2004 | Dieffenderfer | G06F 12/0831 711/146 |
| 2005/0044174 A1* | 2/2005 | Landin | G06F 12/0817 709/217 |
| 2012/0098140 A1* | 4/2012 | Bartley | H01L 25/0657 257/774 |
| 2014/0089587 A1* | 3/2014 | Hikichi | G06F 12/0855 711/122 |
| 2016/0321205 A1 | 11/2016 | Gittins | |
| 2018/0307624 A1* | 10/2018 | Zmora | G06F 12/128 |

* cited by examiner

ACCELERATOR MEMORY COHERENCY WITH SINGLE STATE MACHINE

BACKGROUND

The present disclosure relates to memory coherency, and more specifically, to improved machine performance with accelerator memory coherency.

Memory coherence provides for uniformity of shared data resources which may be stored in multiple locations, (e.g., local caches). If a data resource is stored in multiple locations, it is possible it may be modified in any of those locations. Memory coherency provides for ensuring modifications to shared data resources are centralized to a main memory.

SUMMARY

According to embodiments of the present disclosure, a method for accelerator memory coherency is described. A claw-back request, received from an accelerator, is issued for an address line. While waiting for a response to the claw-back request, a cast-out push request with a matching address line is received. The cast-out push request is associated with a cache having a modified copy of the address line. A combined-response, associated with the cast-out push request, is received from a bus. Data associated with the modified copy of the address line is received from the cache. A claw-back response, with the data associated with the modified version of the address line, is issued to an accelerator.

A computing system and computer program product can embody the method and structures of the disclosure. The computing system can comprise a memory configured as part of an accelerator, and a state machine in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory coherency, and more particular aspects relate to improving machine performance with accelerator memory coherency. While the present disclosure is not necessarily limited to such applications, various aspects of the disclosure may be appreciated through a discussion of various examples using this context.

In a multi-unit system using an accelerator, the accelerator may share a cacheable memory with the system and therefore require a means to "claw back" memory address lines that have been cached, and in some cases modified, by other system units. The accelerator may need to recover the line because the accelerator itself needs to access the address line or because the accelerator implements a check-out directory that has overflowed. When the accelerator needs to ensure that the copy it has of a particular address line in the accelerator memory is up to date (e.g. reflecting all changes made to the address line by other units), the accelerator may use a claw-back request. The claw-back request instructs that all caches in the system go to the invalid state (clearing their matching address line in cache) and that any modified data related to the requested address line be written back to the memory (the accelerator memory, in the case of this disclosure).

The existing default sequence for a claw-back request retrieving modified data is the claw-back request being issued by the accelerator via an accelerator-bus link (e.g., a Probe.I.MO request in cases using an NVLink protocol), becoming a bus claw-back request (e.g., a dcbfc request in cases using an PowerBus protocol) on the bus. If a cache controller snoops, or detects, the claw-back request on the bus and determines that it has an exclusive, modified copy of the requested address line in its cache (e.g., if the cache is in the M-state, or modified state), it will perform an M-state cast-out push (e.g., a cp_m in cases using an PowerBus protocol), and put a copy value of the modified line on the bus. The claw-back request must then be retried by the cache controller while the cast-out push request/response is dealt with on the accelerator-bus link. Only then can the claw-back request be allowed to complete with a resulting claw-back response on the accelerator-bus link.

Thus, the final result in the existing default sequence is two requests, two responses, and one data packet on the accelerator-bus link to complete a claw-back request on one address line. This creates significant latency in the system. Additional latency to complete the claw-back response occurs when the claw-back response must wait for a busto-accelerator cast-out push request/response to complete and cross the accelerator-bus link before the claw-back response can be sent, as the claw-back response must be guaranteed to arrive at the accelerator after the accelerator has seen the cast-out push request.

Described herein is a method and system for handling the claw-back request/response with a state machine. The disclosed state machine possesses a collision state such that it can receive a cast-out push request from the bus while mastering the claw-back request. Thus, a single state machine handles both the cast-out push response and the cleanup of the claw-back request following the issue of the cast-out push request by a cache having a modified address line. The disclosed method and system results in a single response with data to complete the claw-back response and thus returns the modified data to the accelerator with a single packet.

A unit, such as a state machine, mastering a bus claw-back request/response would typically have no "collision state" prior to receiving a positive (e.g., not having been retried) combined response to the claw-back request. For example, on a system using a PowerBus, the state machine would not cause a retry in response to the bus issuing a system broadcast with a matching cache line address. Disclosed herein is a state machine having a collision state associated with its initial state, the collision state allowing the state machine to receive a cast-out push request (or "collide" with the cast-out push as the cast-out push request is not the data the state machine is waiting for) from the bus. With this collision state, any M-state cast-out push request seen on the bus with a matching address line can be received by the state machine mastering the bus claw-back. Without this modification, a second state machine would need to be created to handle the cast-out push request/response.

A computer system for accelerator memory coherency is described herein including a bus (e.g., a PowerBus), an accelerator with an accelerator memory (e.g., a graphics processing unit, or GPU), and a state machine in communication with the accelerator memory and the bus. The state machine is configured to handle claw-back requests and responses issued by the accelerator and distributed through the bus. The state machine has a "snarfing" collision state associated with its initial state, allowing it to receive (or "snarf" as the cast-out push request is intercepted, so to speak, from the second state machine it would otherwise be directed to) an M-state cast-out push request with an address line matching the claw-back request. When a cast-out push request "collides" with the state machine while the state machine is waiting for a response to the claw-back request, the collision state allows the state machine to receive and handle, or "snarf," the cast-out push request, instead of allocating another state machine to handle the cast-out push request.

In its initial state, the state machine is waiting for a "master" combined-response to the claw-back request (because the state machine is "mastering," or originating, the claw-back request on the bus), but with the collision state it can receive a cast-out push request and transition to a state to receive a "snooper" combined-response to the cast-out push request (because the state machine "snoops," or detects, the cast-out push request on the bus), as well as the data associated the modifications to the requested address line. As the state machine is still responsible for handling the claw-back request, it will wait to receive a master combined-response to the claw-back request in order to protect a late combined-response from corrupting the next use of the state machine. Upon receiving, an M-state cast-out push request, the claw-back request is cancelled (from the state machine's perspective) and, once received, the master combined-response to the claw-back request is discarded. The state machine issues a claw-back response to the accelerator as a single packet containing the M-state cache's modified address line data.

In embodiments, the claw-back response may be a 128B packet. It may be advantageous for the claw-back request to be a 128B claw-back request and for only 128B M-state cast-out push requests to be received by the state machine. In embodiments, caches holding just a 64B segment may be rare and creating a 64B response to a 128B request introduces additional complications, so to maintain efficiency the state machine may not be configured to receive 64B cast-out push requests.

The state machine may be configured to detect when an M-state cast-out push request is on the bus, thus triggering the collision state. In embodiments, the bus may be configured to send a received M-state cast-out push request to the state machine, triggering the collision state and causing the state machine to take responsibility for the cast-out push request.

The state machine may be integrated with the accelerator, or it may be a separate component in communication with the accelerator. In embodiments, the state machine may be a representation of a microprocessor configured to take the actions and assume the states described herein.

A method for achieving accelerator memory coherency is described herein. A claw-back request is issued by an accelerator for an address line. A cast-out push request is received from a cache controller associated with cache having an M-state, or an exclusive modified copy, for the requested address line. The cast-out push request is received by a system bus and broadcast to all system units. A cast-out push combined-response and data associated with the modified address line are received from a cache controller. A master combined-response to the claw-back request is received from the bus and discarded. A claw-back response is issued to the accelerator with the modified address line data.

The method may further involve determining whether the cast-out push request has been retried. If the cast-out push request has been retried, the state machine may perform clean-up of the claw-back request, by waiting for and discarding a master claw-back combined-response, and reissue the claw-back request unless another M-state cast-out push request is received. If the cast-out push request is determined not to have been retried, the state machine may proceed to prepare the claw-back response packet as described herein.

Figure 1:
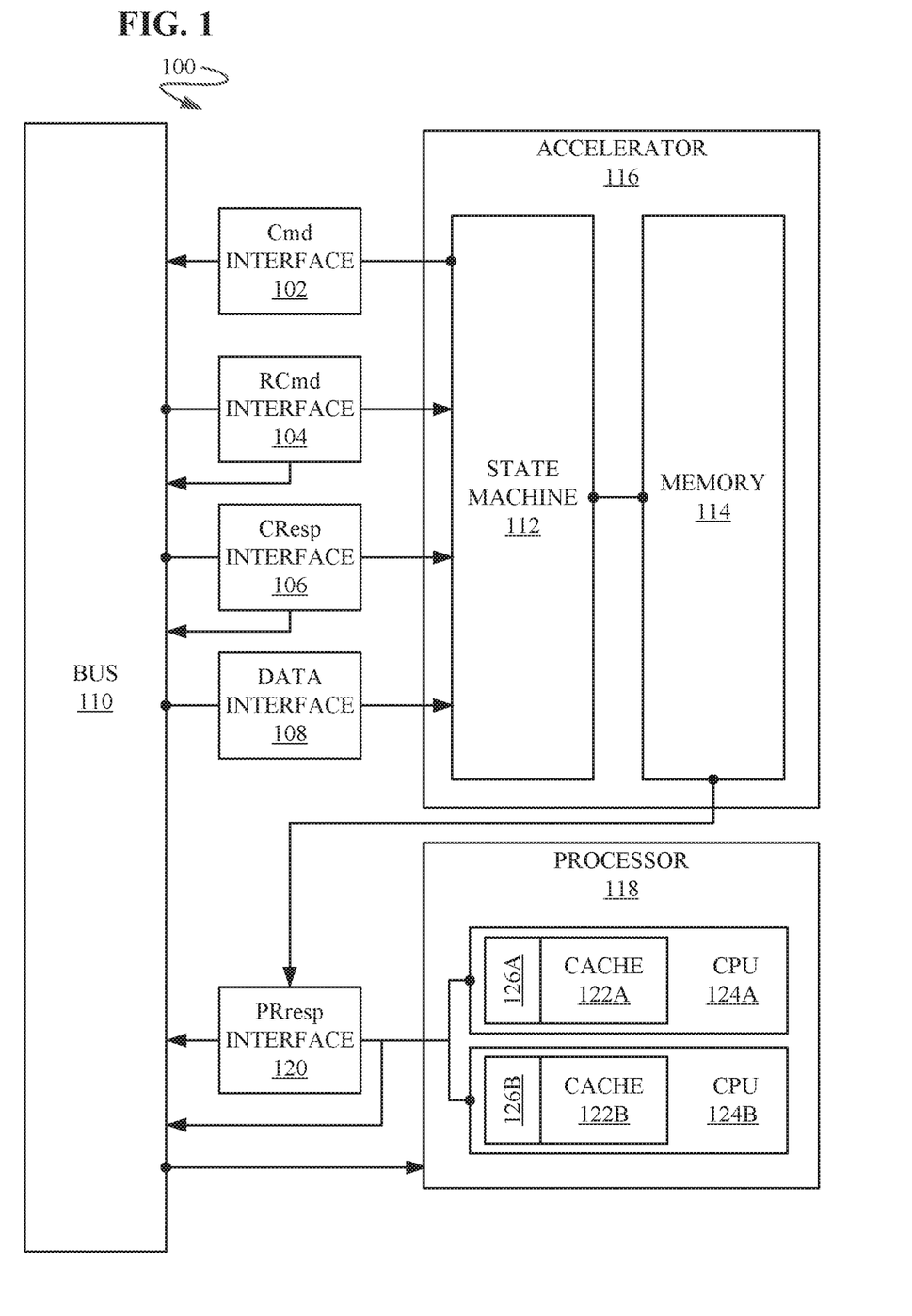
FIG. 1 depicts an example system for accelerator memory coherency, according to embodiments of the present disclosure.

Referring now to FIG. 1, depicted is a block diagram of an example system 100 for accelerator memory coherency, according to embodiments of the present disclosure. The system 100 may include an accelerator 116 having a memory 114. The accelerator 116 may be a GPU, such as a GPU communicating using an NVLink protocol. Accelerator 116 may be any accelerator providing a cacheable memory, such as a cryptograph acceleratoric, SSL or TCP accelerator, etc. Memory 114 is a cacheable memory.

System 100 includes a state machine 112. The state machine 112 may be integrated with the accelerator 116, as shown in this example, or the state machine 112 may be configured as a separate component and communicate with the accelerator 116 wirelessly or through a physical connection. In embodiments, state machine 112 may be a microprocessor configured to perform the actions and assume the states described herein or may represent multiple state machines coordinated such that each state machine works on one or more designated cache lines.

Accelerator 116 communicates with a bus 110, which may be a PowerBus, via an accelerator-bus link. The accelerator-bus link may involve a number of interfaces, such as Cmd ("command") interface 102, RCmd ("reflected command") interface 104, PResp ("partial response") interface 120, CResp ("combined response") interface 106, and data interface 108. Data interface 108 may, for purposes of the disclosed system and method, send data from the bus to the state machine. The state machine 112 may use the Cmd interface 102 to issue commands to the bus. The bus may use the RCmd interface 104 to broadcast commands to all units in the system. Units receiving commands via the RCmd interface 104 may include state machine 112, caches 122A, 122B, cache or memory controllers (such as cache controllers 126A, 126B), etc. In embodiments, RCmd interface 104 commands may be "snooped," or detected, by the receiving device.

The CResp interface 106 may act to deliver a coherence, or claw-back, combined-response from the bus to the state machine. CResp interface 106 can provide signals to distinguish a combined-response for a command snooped by the state machine (e.g., the cast-out push combined response is a snooper combined response to the state machine because the cast-out push request is "snooped," not mastered, by the state machine), from a command mastered by the state machine, e.g., a master claw-back combined-response. The PResp interface 120 may act to deliver each unit's individual partial-response to a command issued by the RCmd interface 104, back to the bus 110. Partial-responses may be received by the CResp interface 106 and combined into a final response which is directed to the state machine 112 and/or back to the bus 110 and broadcast to all units.

Bus 110 may communicate with other system components including, in this example, a processor 118. Processor 118 may contain any number of central processing units (CPUs), such as CPUs 124A and 124B in this example. Each of CPUs 124A and 124B has a cache, 122A and 122B respectively. Each of cache 122A and 122B may be associated with a cache controller 126A, 126B. Each of caches 122A and 122B may have an individual cache controller, as in this example, or a central cache controller may manage each of caches 122A and 122B. In embodiments, a cache controller may act as a snooper, or the snooper may be separate from the cache controller. A snooper is responsible for monitoring the bus 110 for activity concerned with data addresses present in a cache.

For example, a system unit, e.g., CPU 124, issues a read request for an address line. The read request is received by the bus 110 and distributed to the system's unit via RCmd interface 104.

If the line does not exist in any system cache 122A, 122B, then each cache controller 126A, 126B will return a NULL response to the PResp interface 120 when the cache is checked and determined not to contain the requested line. Likewise, most system memory units will check the requested address, determine it is not in their address range, and, in response, issue a NULL response to the PResp interface 120. One memory unit, the main memory unit for purposes of this example, e.g., accelerator memory 114, will check the address and determine itself to be the memory controller responsible for the requested address line, and in response issue an acknowledgement (e.g., lpc_ack using a PowerBus protocol) to the PResp interface 120. Each of the partial-responses received by the PResp interface 120 can then be combined as a completed combined-response (e.g., a go_Me:lpc response using a PowerBus protocol, indicating the main memory, or LPC for "lowest point of coherency," contains a "Me" copy, indicating a clean and exclusive copy of the line) and broadcast to the system units via the CResp interface 106. When the CPU 124 receives the combined-response, it will recognize that it will receive the data for the read (e.g., the read was not retried). When the memory 114 receives the combined response, it will see that the read was not retried and the data associated with the requested address line should be sent to CPU 124A.

If, instead, the cache 122B contains a "Me" copy of the requested line, then when the read request is broadcast via the RCmd interface 104, the cache controller 126B will issue a partial response indicating that is has the "Me" copy (e.g., a clean and exclusive copy, meaning the cache is in the M-state) of the line and that the cache is willing to go the invalid state (e.g. clear the address line in its cache) and make the line available to other units, specifically CPU 124A in this example. The PResp interface 120 receives the partial response from cache controller 126B (e.g., as hpc_ack=Me(Ix) using an PowerBus protocol, indicating that the cache, or HPC for "highest point of coherency," is in the M-state and willing to go to the invalid state) as well as the acknowledgement from memory 114, which also contains a copy of the address line (in this example, the copy in memory 114 is a "dirty" copy, as it does not reflect the changes made to the copy of the line in cache 122B). In response, the CResp interface 106 will broadcast an "early data" combined response (e.g., as go_Me:ed using an PowerBus protocol) indicating that the read requires intervention from a cache, specifically cache 122B in this example. When the CPU 214A receives the early data combined-response, it determines it will receive the requested data, e.g., the read was not retried. When the memory 114 receives the early data combined-response, it determines that a cache, (cache 122B in this example) will be intervening and drops the read. When the cache controller 126B receives the early data combined response, it determines that it should intervene on the read and sends the data associated with the requested line to cache 122A before transitioning to the I-state and clearing the address line in its cache (cache 122B).

Figure 2:
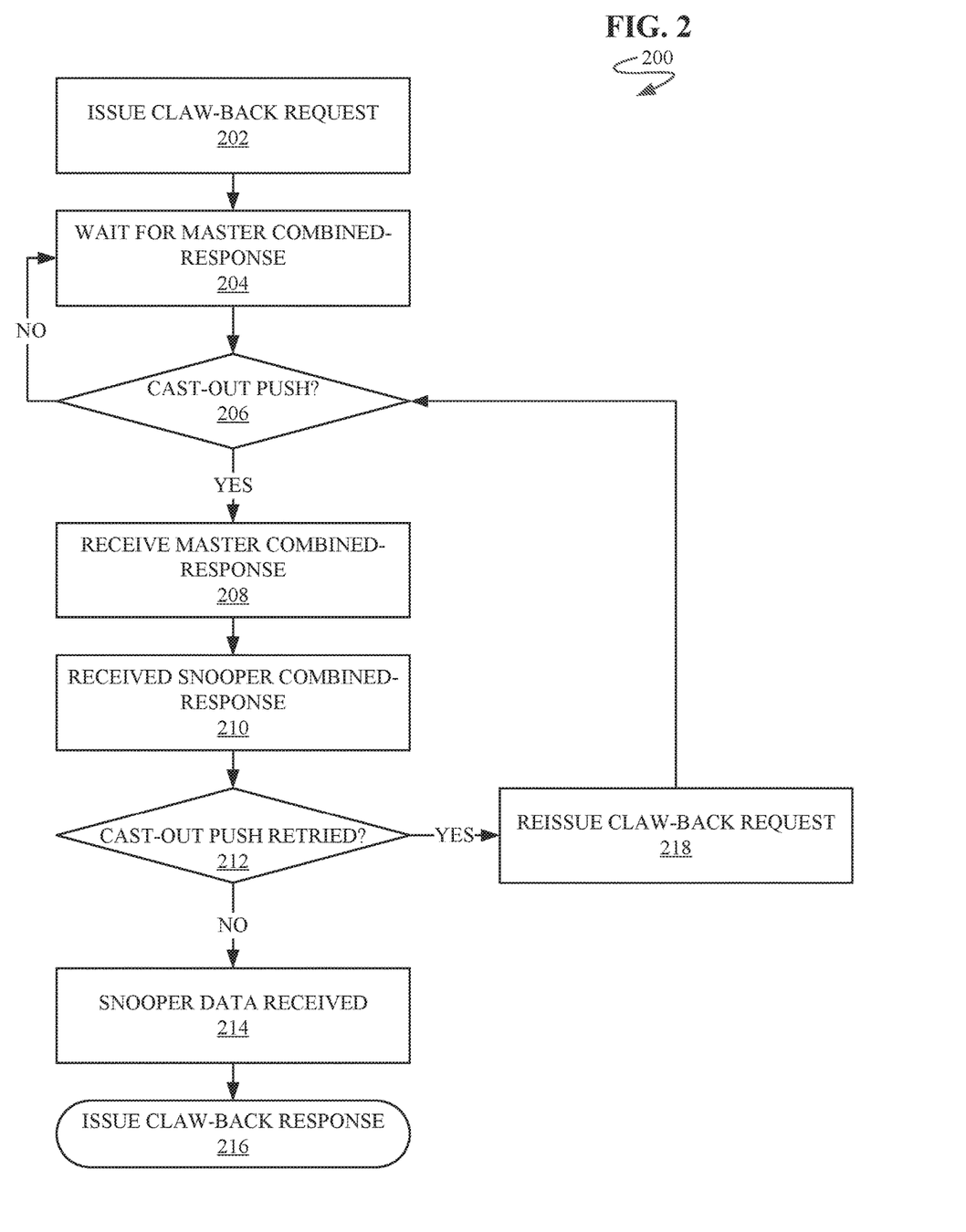
FIG. 2 depicts a flowchart of an example method of handling a cast-out push request, according to embodiments of the present disclosure.

Referring now to FIG. 2, depicted is a flowchart of an example method 200 of handling a cast-out push request, according to embodiments of the present disclosure. Method 200 may be carried out by a state machine, such as state machine 112 of FIG. 1.

At operation 202, a claw-back request, or a memory coherency request, is issued by the state machine to a bus in response to receiving a claw-back request for an address line from an accelerator. For example, in a system using an NVLink protocol, the accelerator issues a Probe.I.MO request, requesting that all caches go to the I (invalid) state (clearing their matching address line and pushing any modified lines to the accelerator memory), which the state machine masters and issues to the bus as a dcbfc command (using a PowerBus protocol).

At operation 204, the state machine enters its initial state after issuing the claw-back request, and waits for a master combined-response from the bus to the claw-back request.

At decision block 206, the state machine determines whether an M-state cast-out push request (e.g., a cp_m request using an PowerBus protocol) is present. The bus may broadcast an M-state cast-out push request it receives from a cache controller to the system, or the state machine may identify that an M-state cast-out push request with a matching address line (matching the address line of the issued claw-back request) is present on the bus and retrieve the cast-out push request. If it is determined that no M-state cast-out push request has been issued, the state machine continues to wait for a master combined-response to the claw-back request, as at operation 204.

If, at decision block 206, it is determined that the state machine is in possession of an M-state cast-out push request, the state machine will transition, according to its collision state, and proceed to wait for the remaining data to arrive, in any possible order. In this example, the state machine receives the master combined-response to the claw-back request, at operation 208, prior to receiving a combined-response related to the cast-out push request (the snooper combined-response). Since a cast-out push request has been received, the state machine has abandoned the claw-back request but will still wait to receive the master combined-response to the claw-back request for clean-up purposes. The master combined-response is received and discarded, to prevent a late combined-response from corrupting the state machine for future use.

At operation 210, a snooper combined-response to the cast-out push request is received from the bus. According to this response, the state machine determines whether the cast-out push request has been retried, as at decision block 212. If the cast-out push request has been retried, the state machine can reissue the claw-back request, as at operation 218. If another cast-out push request has not been received, determined at decision block 206, the state machine may resume waiting for the master combined-response to the claw-back request, as at operation 204.

If, at decision block 212, it is determined that the cast-out push request has not been retried, the state machine may proceed to prepare a claw-back response packet for the accelerator. The state machine receives data regarding the modified address line from the cache controller at operation 214. The state machine may then package the data regarding the modified address line into a claw-back response packet, which may then be issued to the accelerator, as at operation 216.

If the state machine should receive a master combined-response to the claw-back request without receiving a cast-out push request, e.g., while waiting for the master combined-response at operation 204, the state machine will issue a claw-back response to the accelerator according to the received master combined-response. If a cast-out push request is not received, the collision state will not be triggered.

Figure 3A:
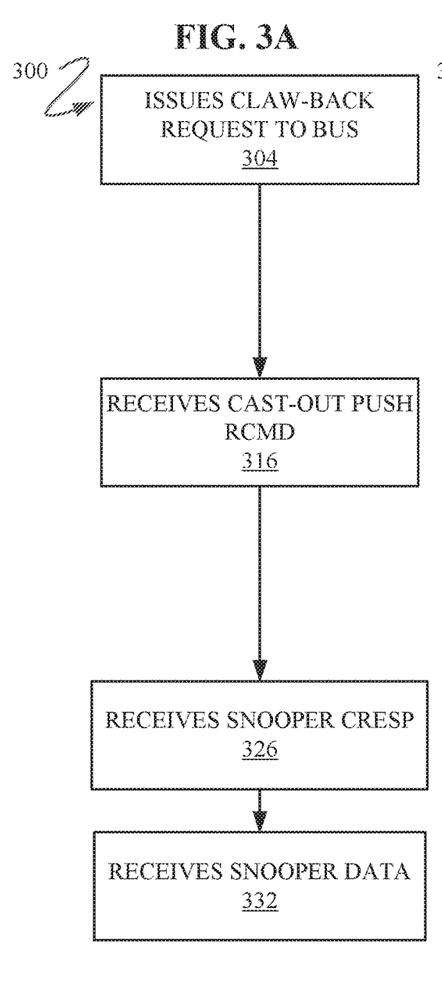
FIG. 3A depicts a flowchart of an example method of handling a cast-out push request as executed by a state machine, according to embodiments of the present disclosure.

Referring now to FIG. 3A, depicted is a flowchart of an example method 300 of handling a cast-out push request as executed by a state machine, according to embodiments of the present disclosure. Method 300 may be carried out by a state machine mastering a claw-back request, such as state machine 112 of FIG. 1.

At operation 304, the state machine issues a claw-back request for an address line to a bus. The claw-back request may be received by the state machine from an accelerator with a cacheable memory. The claw-back request may be issued via an interface, such as Cmd interface 102 of FIG. 1.

At operation 316, the state machine receives an M-state cast-out push request (indicating that another system unit has an exclusive, modified copy of the requested address line) that has been broadcast (e.g., via the RCmd interface 104 of FIG. 1) by a system bus. In embodiments, the state machine may detect the cast-out push request on the bus, rather than receive it. When this cast-out push request "collides" with the state machine, the state machine, having an appropriate collision state, "snarfs" the cast-out push request itself (rather than allocating another state machine to handle the cast-out push request) and transitions to wait for both the claw-back and the cast-out push combined-responses.

At operation 326, the state machine receives the snooper combined-response to the cast-out push request (e.g., via the CResp interface 106 of FIG. 1), and at operation 332 the state machine receives the snooper data relating to the modified copy of the requested address line. The state machine packages the snooper data into a claw-back response to return to the accelerator. In embodiments, the state machine may also wait on a master combined-response to the claw-back request, so that a late received response does not corrupt the state machine for future use.

Figure 3B:
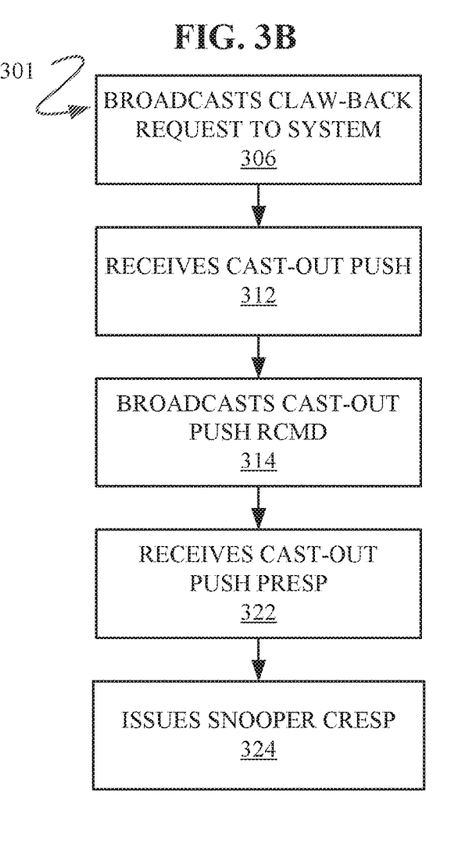
FIG. 3B depicts a flowchart of an example method of handling a cast-out push request as executed by a bus, according to embodiments of the present disclosure.

Referring now to FIG. 3B, depicted is a flowchart of an example method 301 of handling a cast-out push request as executed by a bus, according to embodiments of the present disclosure. Method 301 may be executed by a bus, such as bus 110 of FIG. 1.

At operation 306, the bus receives a claw-back request for an address line from an accelerator (such as the claw-back request issued at operation 304 of FIG. 3A) and broadcasts the request to the system's units (e.g., via the RCmd interface 104 of FIG. 1). At operation 312, the bus receives a cast-out push request from a cache having an M-state, e.g., an exclusive, modified copy of the requested address line. In response, the bus broadcasts the cast-out push request (e.g., via the RCmd interface) to the systems units, at operation 314. The broadcast cast-out push request may coincide with the cast-out push request received by the state machine at operation 316.

At operation 322, the bus receives each unit's cast-out push partial-response (e.g., via the PResp interface 120 of FIG. 1) to the cast-out push request. At operation 324, the bus packages the cast-out push partial-responses into a snooper combined-response (from the perspective of the state machine) and issues the combined-response to the system (e.g., via the CResp interface 106 of FIG. 1). In embodiments, the bus may also receive a partial-response to the claw-back request from each unit and prepare and issue a master combined-response to the claw-back request.

Figure 3C:
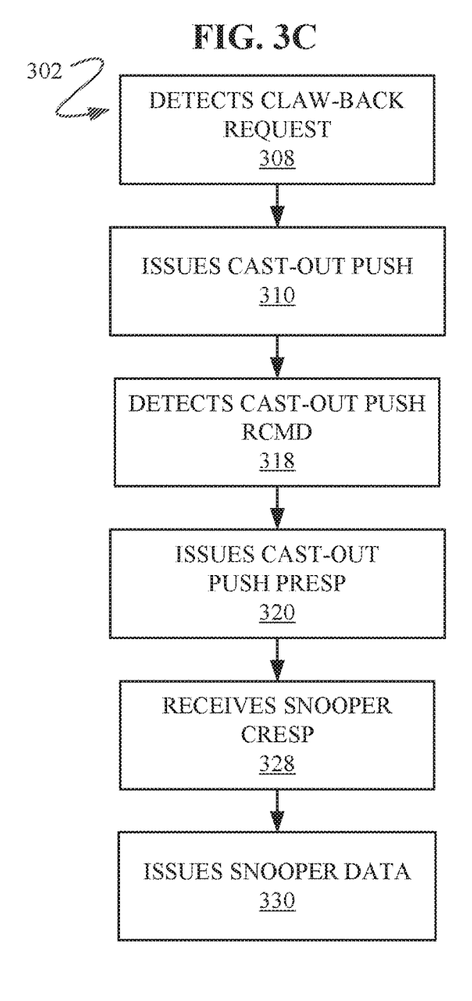
FIG. 3C depicts a flowchart of an example method of handling a cast-out push request as executed by a cache controller, according to embodiments of the present disclosure.

Referring now to FIG. 3C, depicted is a flowchart of an example method 302 of handling a cast-out push request as executed by a cache controller or a snooper, according to embodiments of the present disclosure. Method 302 may be carried out by a cache controller, such as cache controller 126A or 126B of FIG. 1. In embodiments, all or part of method 302 may be carried out by a separate or integrated snooper component.

At operation 308, the cache controller detects, or "snoops," a claw-back request for an address line broadcast by the bus (e.g., the claw-back request broadcast at operation 306 of FIG. 3B). The cache controller reviews the corresponding address line in its cache and determines that is has an exclusive, modified copy (e.g., an M-state copy) of the requested address line. In response, the controller issues a cast-out push request, at operation 310 (e.g., the cast-out push request received at operation 312 of FIG. 3B). The controller may then detect that the system bus has broadcast the cast-out push request, at operation 318 (e.g., the cast-out push RCmd of operation 314 of FIG. 3B), and issue a partial-response in response, at operation 320 (e.g., the cast-out push PResp of operation 322 of FIG. 3B). At operation 328, the controller may then receive the snooper combined-response prepared by the bus (e.g., snooper CRmd of operation 324 of FIG. 3B) and, according to the snooper combined-response, confirms that its modified copy of the address line is exclusive, and not shared by another system unit (e.g. the cache controller reviews the snooper combined-response and determines that no other system unit identifies itself as having an M-state copy of the address line). The controller then issues the snooper data (the data describing the modifications to the requested address line), at operation 330 (e.g., the data received at operation 332 of FIG. 3A). In embodiments, the cache controller may also retry the claw-back request and/or issue a partial response to the claw-back request.

Figure 4:
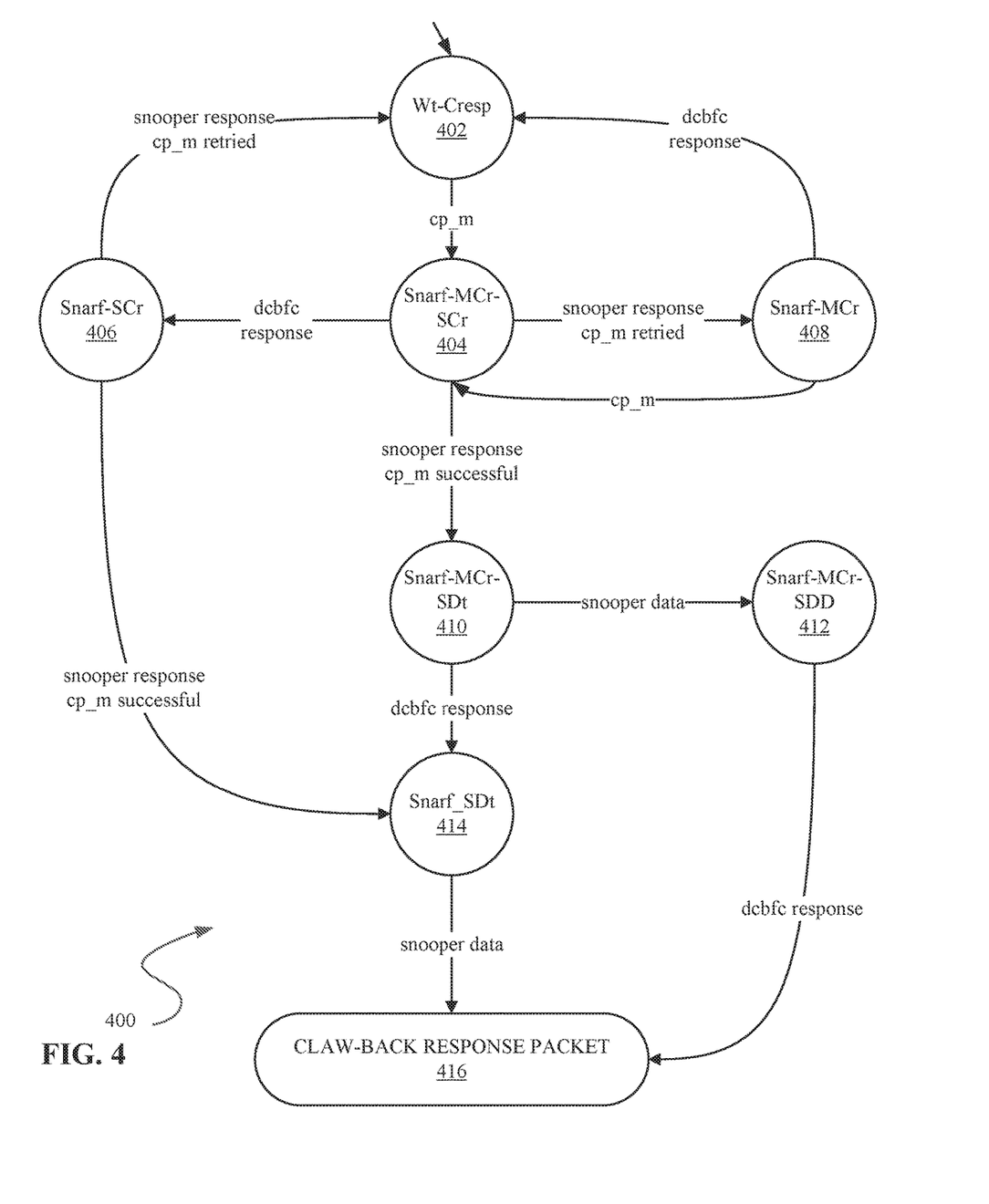
FIG. 4 depicts a state diagram for an example state machine configured for mastering a claw-back request with a cast-out push collision state, according to embodiments of the present disclosure.

Referring now to FIG. 4, depicted is a state diagram 400 for an example state machine configured for mastering a claw-back request with a cast-out push collision state, according to embodiments of the present disclosure. State diagram 400 may represent the logic controlling a state machine, such as state machine 112 of FIG. 1. It is to be understood that the depicted organization of the state diagram as incorporating PowerBus protocol terminology (cp_m, dcbfc, etc.) as in FIG. 4 is to be non-limiting, as other possible configurations are possible.

The state machine may assume initial state Wt-Cresp (waiting for combined-response) 402 upon issuing a claw-back request for the accelerator. In the Wt-Cresp 402 state, the state machine is waiting for a master combined-response to the claw-back request (e.g., a dcbfc request). If the state machine receives an M-state cast-out push request (e.g., a cp_m) while in the Wt-Cresp 402 state, the state machine's collision state allows the state machine to receive (or snarf) the cast-out push request and transition to the Snarf-MCr-SCr (snarfing state waiting for master combined-response and snooper combined-response) 404 state. While in the Snarf-MCr-SCr 404 state, the state machine is waiting for both the master (dcbfc) combined-response and the snooper (cp_m) combined-response.

If a master (dcbfc) combined-response is received while the state machine is in the Snarf-MCr-SCr 404 state, the master (dcbfc) combined-response is discarded for clean-up purposes and the state machine transitions to the Snarf-SCr (snarfing state waiting for snooper combined-response) 406 state. While in the Snarf-SCr 406 state, the state machine is waiting for the snooper (cp_m) combined response.

If a snooper (cp_m) combined-response is received while the state machine is in the Snarf-SCr 406 state, and it is determined that the cp_m was retried (e.g., using PowerBus protocol, the snooper combined-response indicates: response!=addr_ack_done), the claw-back (dcbfc) request is reissued or restarted and the state machine transitions back to the initial Wt-Cresp 402 state.

If a snooper (cp_m) combined-response is received while the state machine is in the Snarf-SCr 406 state, and it is determined that the cp_m will be successful (e.g., using the PowerBus protocol, the snooper combined-response indicates: response=addr_ack_done), the state machine transitions to the Snarf-SDt (snarfing state waiting for snooper data) 414 state. While in the Snarf-SDt 414 state, the state machine is waiting for the data packet from the snooper (e.g., that data related to the cp_m and/or the data related to the requested address line from the M-state cache). Once the snooper (cp_m) data is received, the state machine sends the claw-back response packet to the accelerator, as at operation 416, including the snooper data.

If a snooper (cp_m) combined-response is received while the state machine is in the Snarf-MCr-SCr 404 state, and it is determined that the cast-out push was retried, the state machine transitions to the Snarf-MCr (snarfing state waiting for master combined-response) 408 state. While in the Snarf-MCr 408 state, the state machine is waiting for the master (dcbfc) combined-response after a cast-out push was retried. If the master combined-response is received, the response is discarded, for clean-up, and the state machine reissues the claw-back (dcbfc) request and resumes its initial Wt-Cresp 402 state. If, instead, another M-state cast-out push (cp_m) request is received, the state machine returns to the Snarf-MCr-SCr 404 state.

If a snooper (cp_m) combined-response is received while the state machine is in the Snarf-MCr-SCr 404 state, and it is determined that the cast-out push will be successful, the state machine transitions to the Snarf-MCr-SDt (snarfing state waiting for master combined-response and snooper data) 410 state. While in the Snarf-MCr-SDt 410 state, the state machine is waiting for both the master (dcbfc) combined-response and the snooper data (related to the modified address line). If the claw-back response is received, the response is discarded and the state machine transitions to the Snarf-SDt 414 state to wait for the snooper data. Once the snooper data is received it is packaged and sent to the accelerator, at operation 416.

If the snooper data is received while the state machine is in the Snarf-MCr-SDt 410 state, the state machine transitions to the Snarf-MCr-SDD (snarfing state waiting for master combined-response snooper data delivered) 412 state. While in the Snarf-MCr-SDD 412 state, the state machine is waiting for the master (dcbfc) combined-response after receiving the snooper data and snooper combined-response. Once the claw-back response is received, the state machine discards the master (dcbfc) combined-response and packages the snooper data and sends to the accelerator, at operation 416.

Figure 5:
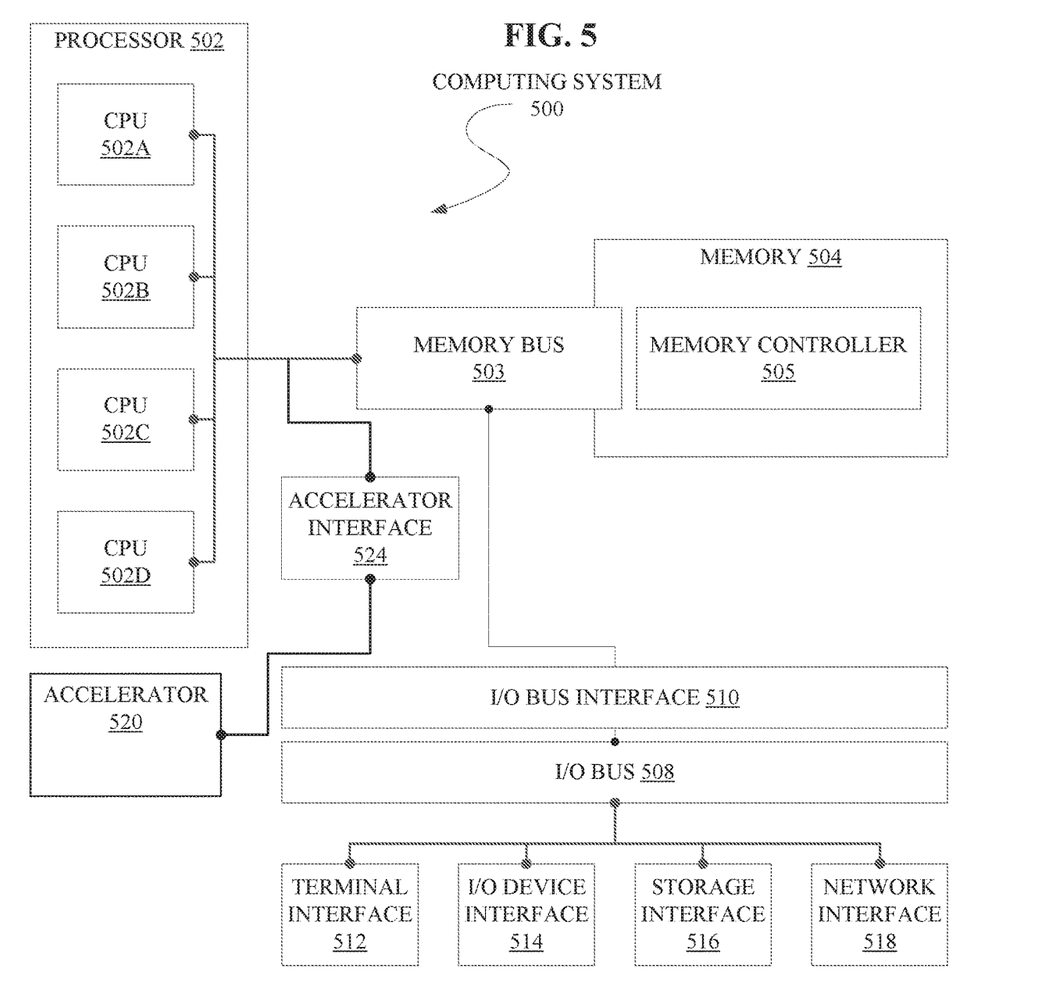
FIG. 5 depicts a high-level block diagram of an example computer system for implementing one or more of the methods or modules, and any related functions or operations, described herein, in accordance with embodiments of the present disclosure.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

The computer system 500 may have an accelerator 520 integrated, such as via an accelerator interface 524. The link between the accelerator 520 and both the processor 502 and the memory 504 may be improved, with a higher bandwidth and lower latency, by the accelerator interface connecting at the junction of the processor 502 and the memory bus 503, e.g., using OpenCAPI architecture. Communication from the accelerator 520 to the accelerator interface 524 may use an NVLink protocol and communication from the accelerator interface 524 to the system may use a PowerBus protocol, as exemplified herein. Accelerator interface 524 may incorporate interfaces 102, 104, 106, 108, and 120 of FIG. 1.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for accelerator memory coherency comprising:
    issuing, from a singular state machine, a claw-back request for an address line, the claw-back request received from an accelerator via a bus;
    in response to issuing the claw-back request, assuming, by the singular state machine, a waiting state;
    receiving, from the bus and at the singular state machine, a cast-out push request with a matching address line;
    in response to receiving the cast-out push request, transitioning, by the singular state machine, to a first snarfing state;
    receiving, from a cache controller and at the singular state machine, a first combined-response associated with the cast-out push request;
    in response to receiving the first combined-response, transitioning to a second snarfing state;
    receiving, from the first combined-response and at the singular state machine, data associated with the modified copy of the address line; and
    in response to receiving data associated with the modified address line, issuing, from the singular state machine, a claw-back response, to the accelerator, wherein the claw-back response is a single packet containing the data associated with the modified version of the address line.

2. The method of claim 1, further comprising determining, according to the first combined-response, that the cast-out push request was not retried.

3. The method of claim 2, wherein issuing the claw-back response is in response to determining that the cast-out push request was not retried.

4. The method of claim 1 further comprising determining, according to the first combined-response, that the cast-out push request was retried.

5. The method of claim 4, further comprising receiving, in response to determining that the cast-out push request was retried, a second cast-out push request.

6. The method of claim 4, further comprising reissuing, in response to determining that the cast-out push request was retried, the claw-back request.

7. The method of claim 1, further comprising receiving a second combined-response, the second combined-response associated with the claw-back request.

8. The method of claim 7, further comprising discarding the second combined-response.

9. A computer program product for accelerator memory coherency, the computer program product comprising a computer readable storage medium having program instructions embodied therewith, wherein the computer readable storage medium is not a transitory signal per se, the program instructions executable by a processor to perform a method comprising:
    issuing, from a singular state machine, a claw-back request for an address line, the claw-back request received from an accelerator via a bus;
    in response to issuing the claw-back request, assuming, by the singular state machine, a waiting state;
    receiving, from the bus and at the singular state machine, a cast-out push request with a matching address line;
    in response to receiving the cast-out push request, transitioning, by the singular state machine, to a first snarfing state;
    receiving, from a cache controller and at the singular state machine, a first combined-response associated with the cast-out push request;

in response to receiving the first combined-response, transitioning to a second snarfing state;

receiving, from the first combined-response and at the singular state machine, data associated with the modified copy of the address line; and in response to receiving data associated with the modified address line, issuing, from the singular state machine, a claw-back response, to the accelerator, wherein the claw-back response is a single packet containing the data associated with the modified version of the address line.

10. A computer system for accelerator memory coherency comprising:

a bus;

an accelerator coupled with an accelerator memory;

a singular state machine in communication with the accelerator memory and the bus, wherein the singular state machine is configured to:

in response to receiving, from the accelerator, a claw-back request for an address line, master and issue the claw-back request via the bus;

in response to mastering and issuing the claw-back request, assume a waiting state;

receive, from the bus, a cast-out push request with a matching address line;

in response to receiving the cast-out push request, transition to a first snarfing state;

receive, from a cache controller, a first combined-response associated with the cast-out push request;

in response to receiving the first combined-response, transition to a second snarfing state;

receive, from the first combined-response, data associated with the modified address line; and in response to receiving data associated with the modified address line, issue a claw-back response to the accelerator, wherein the claw-back response is a single packet containing the data associated with the modified address line.

11. The system of claim 10, wherein the cast-out push request is issued by a cache controller associated with a cache having a modified copy of the address line.

12. The system of claim 10, wherein the state machine is further configured to receive a second combined-response, the second combined-response associated with the claw-back request.

13. The system of claim 12, wherein the state machine is configured with an initial state, wherein when in the initial state the state machine is waiting for the second combined-response.

14. The system of claim 13, wherein the initial state further comprises a state variable, the state variable providing a collision state.

15. The system of claim 14, wherein the collision state enables the state machine to receive the cast-out push request while waiting for the second combined-response.

16. The system of claim 10, wherein the state machine is integrated with the accelerator.

17. The system of claim 10, wherein the bus is a Power-Bus.

18. The system of claim 10, wherein the accelerator communicates using an NVLink protocol.

19. The system of claim 10, wherein the claw-back response is a 128B packet.

20. The system of claim 10, wherein the state machine snoops the cast-out push request on the bus.

* * * * *